US008238317B2

(12) United States Patent
Yang et al.

(10) Patent No.: US 8,238,317 B2
(45) Date of Patent: Aug. 7, 2012

(54) METHOD AND APPARATUS FOR ROUTING PACKET

(75) Inventors: Jun-Mo Yang, Suwon-si (KR); Dae-Hyung Kwon, Seoul (KR); Sang-Hun Chung, Daejeon (KR)

(73) Assignee: Samsung Electronics Co., Ltd (KR)

( * ) Notice: Subject to any disclaimer, the term of this patent is extended or adjusted under 35 U.S.C. 154(b) by 410 days.

(21) Appl. No.: 12/651,722

(22) Filed: Jan. 4, 2010

(65) Prior Publication Data
US 2010/0172258 A1 Jul. 8, 2010

(30) Foreign Application Priority Data

Jan. 2, 2009 (KR) ........................ 10-2009-0000104

(51) Int. Cl.
*H04W 4/00* (2009.01)
(52) U.S. Cl. ........................................ 370/338
(58) Field of Classification Search .................. 370/310, 370/312, 328–338, 349
See application file for complete search history.

(56) References Cited

U.S. PATENT DOCUMENTS

| 5,987,011 | A  | * | 11/1999 | Toh ............................ 370/331 |
| 6,763,014 | B2 |   | 7/2004  | Kennedy |
| 8,036,224 | B2 | * | 10/2011 | Axelsson et al. ........ 370/395.21 |
| 2002/0191573 | A1 |   | 12/2002 | Whitehill et al. |
| 2004/0022223 | A1 |   | 2/2004  | Billhartz |

FOREIGN PATENT DOCUMENTS

| KR | 1020040014551 | 2/2004 |
| KR | 1020050026707 | 3/2005 |
| KR | 1020050059186 | 6/2005 |
| WO | WO 03/077452  | 9/2003 |

OTHER PUBLICATIONS

Karp, Geographic Routing for Wireless Networks, Thesis, Harvard University Cambridge, Massachusetts, 118 pages, Oct. 2000.*
Brad Karp et al., "GPSR: Greedy Perimeter Stateless Routing for Wireless Networks", Mobicom 2000.
Lifei Huang et al., "On the Scalability of IEEE 802.11 Ad Hoc Networks", 2002.

* cited by examiner

*Primary Examiner* — Frank Duong
(74) *Attorney, Agent, or Firm* — The Farrell Law Firm, P.C.

(57) ABSTRACT

Disclosed is a packet routing method in an ad-hoc network. The method includes periodically calculating a link stability with respect to each neighbor node by means of the number of beacon frames lost within an update period for each neighbor node, updating the calculated link stability in the neighbor node table; identifying a neighbor node which is closer to a destination node of a received packet than the node when the node itself does not correspond to the destination node; and transmitting the received packet to the identified neighbor node when the identified link stability of the neighbor node is greater than or equal to a threshold value.

8 Claims, 3 Drawing Sheets

METHOD AND APPARATUS FOR ROUTING PACKET

PRIORITY

This application claims priority under 35 U.S.C. §119(a) to an application entitled "Method And Apparatus For Routing Packet" filed in the Korean Industrial Property Office on Jan. 2, 2009 and assigned Serial No. 10-2009-0000104, the contents of which are hereby incorporated by reference.

BACKGROUND OF THE INVENTION

1. Field of the Invention

The present invention relates to a method and apparatus for routing packets in an ad-hoc network, and more particularly to a position-based routing method and apparatus.

2. Description of the Related Art

In an ad-hoc network, there are two types of representative routing schemes, a reactive scheme and a proactive scheme. The reactive scheme is an on-demand scheme that sets up a route from a source node to a destination node whenever necessary. The proactive scheme is a table-driven scheme that sets up a route through the use of a routing table. Upon such a route setup, there may be a contradiction relationship (trade-off) in terms of time, resources, accuracy, etc, between the nodes.

Generally, a position-based routing scheme and a topology-based routing scheme include a combination of the reactive scheme and proactive scheme. Greedy Perimeter Stateless Routing (GPSR) is a representative position-based routing protocol. GPSR is composed of two forwarding modes: a greedy forwarding mode and a perimeter forwarding mode.

In the greedy forwarding mode, when a first node needs to transmit a packet to a destination, and one or more neighbor nodes are closer in distance to the destination node than to the first node, the first node transmits the packet to a neighbor node closest to the destination node among the neighbor nodes. In the perimeter forwarding mode, when a first node needs to transmit a packet to a destination node, and no neighbor node is closer to the destination node than to the first node, the first node transmits the packet to every neighbor node in sequence.

In GPSR, each node has a Global Positioning System (GPS), and stores the addresses and location information of neighbor nodes. For this reason, a route can be pruned through the use of a two-dimensional subgraph (i.e. a planar subgraph). The GPSR has been designed to transmit a packet in the greedy forwarding scheme, and to transmit a packet in the perimeter forwarding scheme when the greedy forwarding scheme cannot be applied.

Therefore, each node stores a neighbor node table, and periodically updates the neighbor node table. The neighbor nodes refers to nodes located within a one-hop transmission range with respect to a reference node. The neighbor node table includes information on neighbor nodes, and specifically, the neighbor node table contains information on neighbor nodes determined as nodes currently linked with the reference node, and information on neighbor nodes determined as nodes which are currently unlinked with the reference node, but have been linked with the reference node in the past. Whether a reference node is linked with a neighbor node is determined based on whether the reference node receives a beacon frame from the corresponding neighbor node within a predetermined time period. A beacon frame is periodically broadcast by each node, and includes location information of each node. When no beacon frame is received from a node included in a neighbor node table during the predetermined time period, information on the corresponding node is deleted from the neighbor node table. The predetermined time period may be greater than the broadcasting period of the beacon frame.

In the following description, a general procedure of transmitting a packet in the GPSR will be explained with reference to FIG. 1. FIG. 1 shows an ad-hoc network, which includes node i, node j, node k, node l, node m, node n, node o, and node D. In the ad-hoc network of FIG. 1, it is assumed that the neighbor nodes of node i are node j and node k, and node i has received a packet whose destination node is node D.

If it is determined that a link from node i to node j is in a normal state, node i routes the packet to node j, and then the packet is transferred from node j to node D, as a route shown as a dotted line in FIG. 1. In contrast, if it is determined that a link from node i to node j is not in a normal state, node i routes the packet to node k. Thus, the packet is transferred to node D via node k, node l, node m, node n, and node o, a route shown as a solid line in FIG. 1. That is, the transmission mode shifts to the perimeter forwarding mode.

Although a link between nodes is in a normal state, beacon frames broadcast from each node may collide with each other. The transmission success rate of a beacon frame is approximately 19.7% (1 beacon period, 5 nodes, 1-hop). The transmission success rate of a beacon frame has a tendency to decrease as the number of nodes increases. Nevertheless, when a predetermined number of beacon frames are lost, the forwarding mode may be immediately changed from the greedy forwarding mode to the perimeter forwarding mode, which may cause a mistake of setting up a route which detours around a short route. In the worst case, the packet does not arrive at the destination node.

Also, in the ad-hoc network, link breakage phenomena may be temporarily caused by obstacles, mobility, collision of beacon frames, noise, etc., and may be recovered to a normal state within a short time period. Nevertheless, the conventional GPSR is designed without taking into consideration when a temporary breakage of a link occurs, a route detouring around an actually existing link may be set up, so that network performance degradation, such as an increase in throughput and delay, may occur.

SUMMARY OF THE INVENTION

Accordingly, the present invention has been made to solve at least the above-mentioned problems occurring in the prior art, and the present invention provides a routing method and apparatus capable of preventing a mistake by the GPSR even when a link is temporarily broken.

In addition, the present invention provides a routing method and apparatus capable of preventing an increase in throughput of the network and delay.

In accordance with an aspect of the present invention, there is provided a method that includes periodically calculating a link stability with respect to each neighbor node by means of the number of received beacon frames and the number of non-received beacon frames within an update period of a neighbor node table according to neighbor nodes, and updating the calculated link stability in the neighbor node table; when the node itself does not correspond to a destination node of a received packet, identifying a neighbor node which is closer to the destination node than the node; and when a link stability of the identified neighbor node is greater than or equal to a threshold value, transmitting the received packet to the identified neighbor node.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Figure 1:
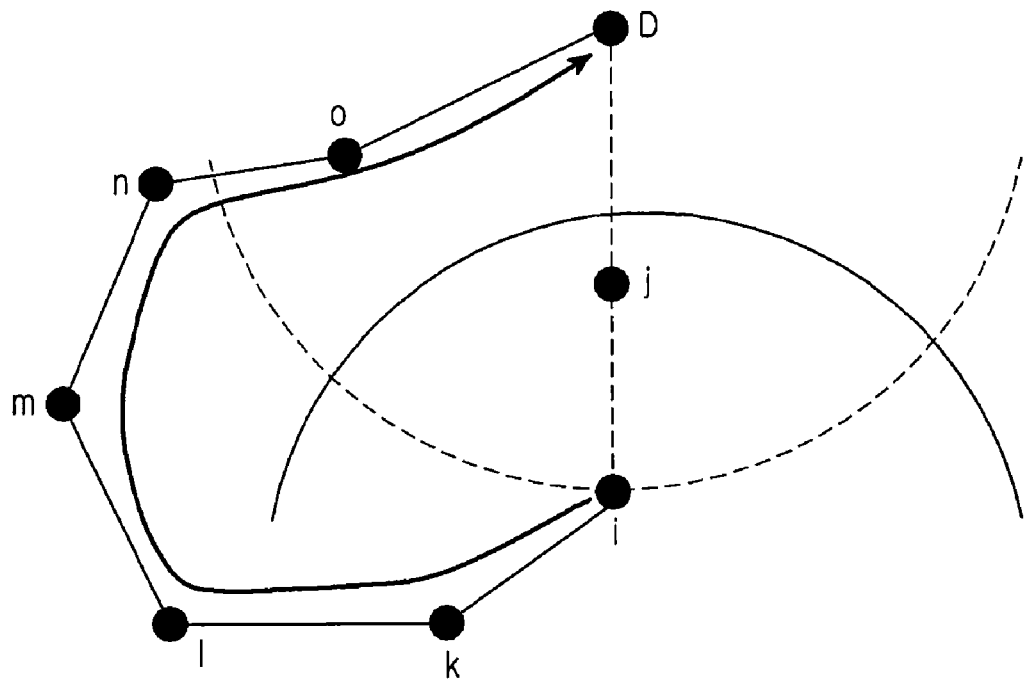
FIG. 1 is a diagram illustrating an ad-hoc network.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

Figure 2:
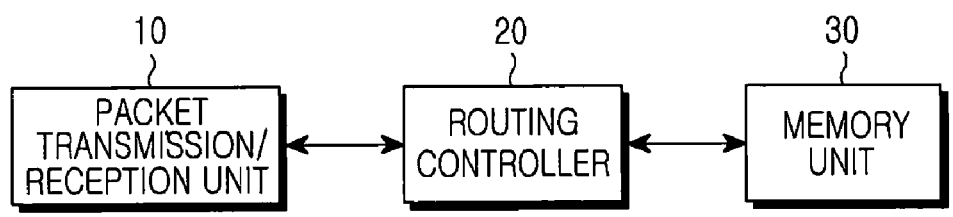
FIG. 2 is a block diagram illustrating a routing apparatus according to an embodiment of the present invention.

First, the configuration of a routing apparatus included within each node in an ad-hoc network according to an embodiment of the present invention will be described with reference to FIG. 2. A node includes a packet transmission/reception unit 10, a routing controller 20, and memory unit 30.

The packet transmission/reception unit 10 transmits/receives a packet under the control of the routing controller 20.

The memory unit 30 stores a neighbor node table and a threshold value. The threshold value is used as a reference for determining whether a link between nodes is broken. According to an embodiment of the present invention, the neighbor node table includes the IDs of neighbor nodes located within a one-hop transmission range from the node itself, which stores the neighbor node table, the addresses of the neighbor nodes, the numbers of lost beacon frames of the neighbor nodes, and link stability. An example of the neighbor node table may be expressed as shown in Table 1.

TABLE 1

| ID of Neighbor node | Address | Number of Lost beacon frames | Link Stability |
| --- | --- | --- | --- |

The number of lost beacon frames represents the number of beacon frames which are not received normally within an update period for a corresponding neighbor node in the neighbor node table. Since the beacon frame is broadcast during the same period, the beacon transmission periods of all nodes are the same. In addition, the beacon transmission period is shorter than the update period of the neighbor node table in each node.

The link stability represents information related to the probability that a link formed between a node and a corresponding neighbor node is stable. The stability p(i,j) of a link to node j from node i can be obtained by Equation (1).

$$P(i, j) \begin{cases} = 1, & \text{only when receiving beacon frame within } T(j) \\ = 1 - (B(j) \times D) / (C(j) \times T(j)), & \text{otherwise} \end{cases} \quad (1)$$

Herein, p(i,j) represents the stability of a link from node i to node j, T(j) represents an update period for node j in the neighbor node table, B(j) represents the number of beacon frames lost during T(j) with respect to node j, D represents a beacon frame transmission period, and C(j) represents the number of beacon frames received from node j during T(j).

The link stability can be obtained by Equation (1), wherein, since p(i,j) is a value having a direction, p(i,j) and p(j,i) may be different from each other.

p(i,j) having a value of 1 corresponds to the case where node i has received a beacon frame from node j within a preset beacon transmission period, and the link between the two nodes is in a stable state. A link stability degree can be calculated with a ratio of the number of beacon frames lost during a beacon transmission period to the number of beacon frames successfully received within the update period of the neighbor node table, as expressed in Equation (1).

Since the number of actually-received beacon frames acts as a factor for enhancing the stability, and the number of lost beacon frames acts as a factor for degrading the stability, the stability of a link between two nodes can be calculated by Equation (1). In addition, Equation (1) is designed with both the beacon transmission period and the update period of the neighbor node table being taken into consideration. Accordingly, when a predetermined beacon frame is not received, Equation (1) allows for a possibility of link existence to be managed by probabilities, rather than from the conventional binary scheme determining that no link exists.

Figure 3:
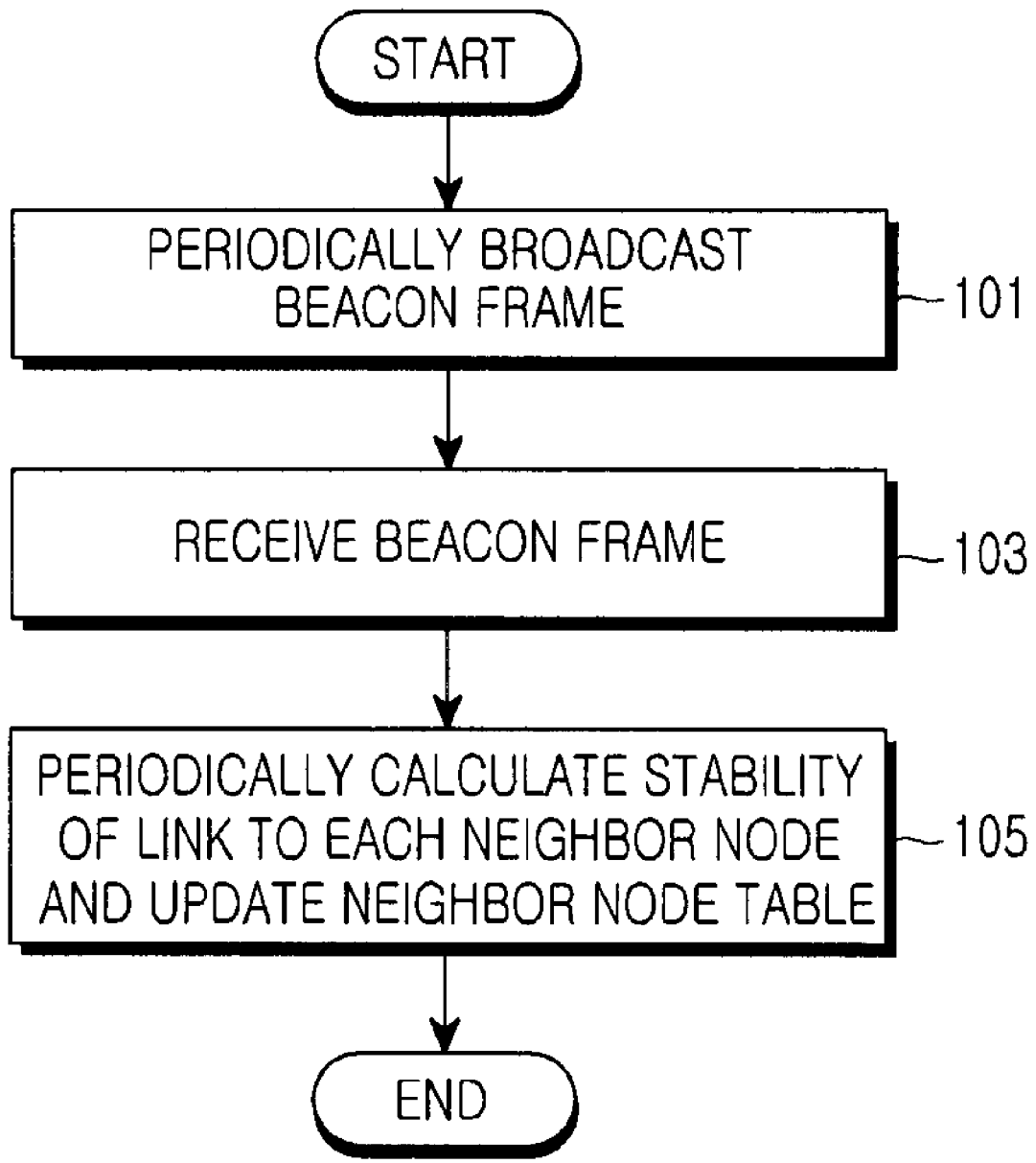
FIGS. 3 and 4 are flowcharts illustrating the operation procedure of the routing apparatus according to an embodiment of the present invention.
Figure 4:
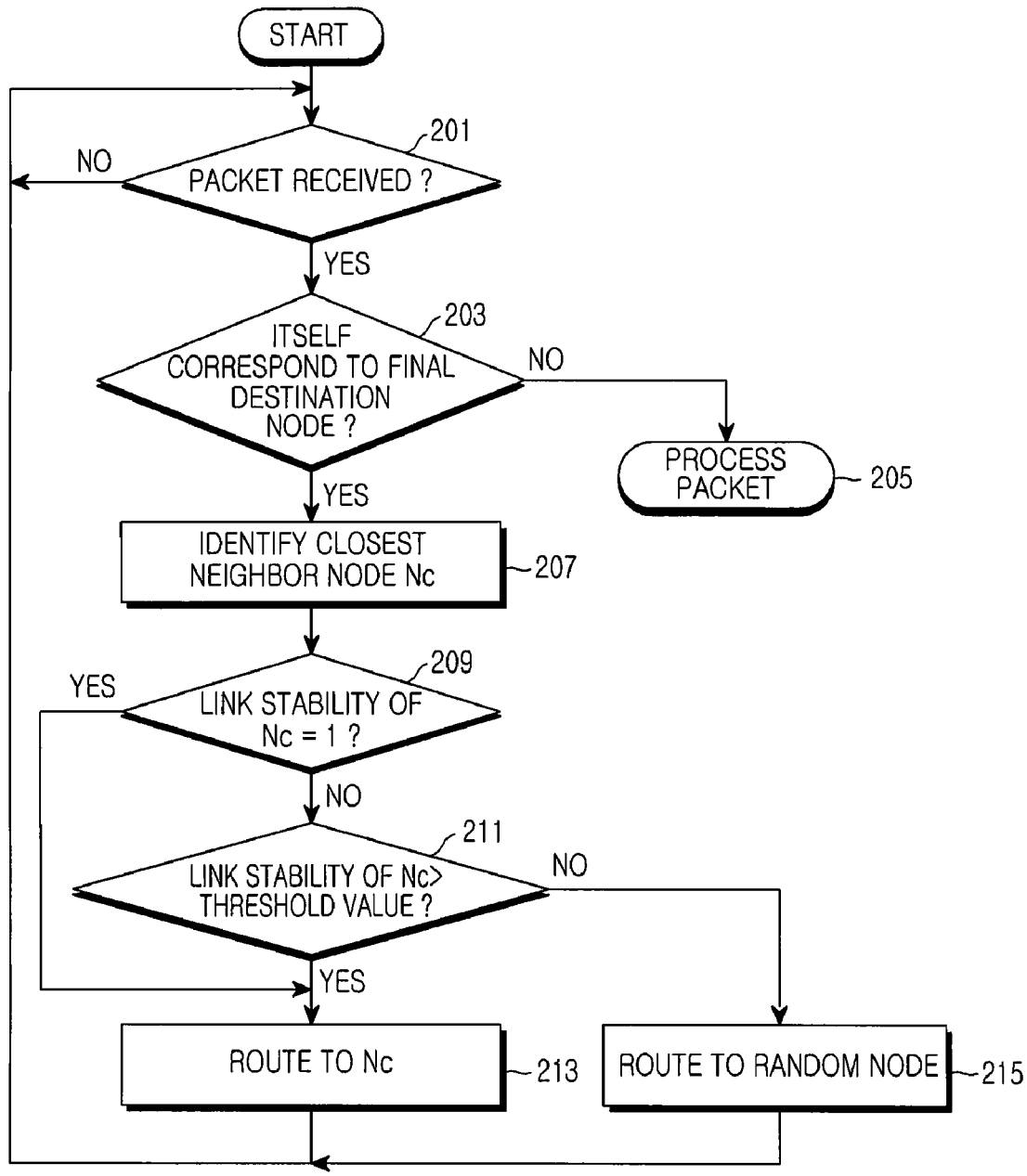

In a node configured as described above, the operation procedure of the routing controller 20 according to an embodiment of the present invention is shown in FIGS. 3 and 4. Referring to FIGS. 3 and 4, the routing controller 20 periodically broadcasts a beacon frame in step 101, receives beacon frames from each neighbor node and counts the number of received beacon frames in step 103, and periodically calculates the stability of a link corresponding to each neighbor node and updates the neighbor node table in step 105.

In addition, when receiving a packet from a first node in step 201, the routing controller 20 determines if a node (hereinafter, referred to as "the routing controller node"), to which the routing controller 20 belongs, corresponds to the final destination node of the received packet in step 203. When it is determined that its the routing controller corresponds to the final destination node of the received packet as a result of step 203, the routing controller 20 processes the received packet in step 205. In contrast, when it is determined that the routing controller node does not correspond to the final destination node of the received packet, the routing controller 20 identifies neighbor nodes which are closer to the destination node than routing controller node, from among the overall neighbor nodes, and identifies a neighbor node Nc closest to the destination node from among the closer neighbor nodes in step 207. The destination node may become node Nc. If there is no node which is closer to the destination node than the routing controller node, the routing controller 20 routes the received packet to a random neighbor node.

After identifying neighbor node Nc closest to the destination node, the routing controller 20 checks the stability of a link to node Nc in step 209, and transmits the packet to node Nc in step 213 when the link stability has a value of 1. In contrast, when the link stability does not have a value of 1, the routing controller 20 compares the stability of the link to node Nc with a threshold value in step 211. When it is determined that the link stability is greater than or equal to the threshold value as a result of the comparison, the routing controller 20 determines that the link to node Nc is in a normal state, and transmits the received packet to node Nc in step 213. In this case, if the greedy forwarding mode is set up with respect to node Nc, the greedy forwarding mode for node Nc is maintained, and if the perimeter forwarding mode is set up with respect to node Nc, the forwarding mode for node Nc shifts to the greedy forwarding mode.

When the stability of the link to node Nc is less than the threshold value, the routing controller 20 determines that the link to node Nc is unstable, and transmits the received packet to a random node in step 215. If the greedy forwarding mode is set up with respect to node Nc, the forwarding mode for node Nc shifts to the perimeter forwarding mode, and if the perimeter forwarding mode is set up with respect to node Nc, the perimeter forwarding mode for node Nc is maintained.

In contrast to considering only the number of lost beacon frames in order to identify if the link to the neighbor node is unstable, the apparatus and method according to the present invention can identify if the link to a neighbor node is unstable by periodically updating the link stability as shown in Equation (1) and comparing the link stability with the threshold value, so that it is possible to more accurately identify whether a link is stable or not. Thus, it is possible to reduce unnecessary routing.

According to the present invention, it is possible to prevent the phenomena where a packet is detoured and transmitted to a destination, or is not transmitted to the destination, which have been caused in the prior art due to a frequent collision of beacon frames, so that the use of network resources is minimized, and a throughput is increased and a transmission delay can be reduced.

While the invention has been shown and described with reference to certain embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for routing a packet by a node in an ad-hoc network, the method comprising the steps of:
periodically calculating a link stability with respect to each neighbor node, the link stability based on a number of received beacon frames and a number of non-received beacon frames within an update period for each neighbor node;
updating the calculated link stability in a neighbor node table;
when the node does not correspond to a destination node of a received packet, identifying a neighbor node which is closer to the destination node than the node; and
when a link stability of the identified neighbor node is greater than or equal to a threshold value, transmitting the received packet to the identified neighbor node.

2. The method as claimed in claim 1, further comprising transmitting the received packet to a random neighbor node among the neighbor nodes when the link stability of the identified neighbor node is less than the threshold value.

3. The method as claimed in claim 2, wherein the link stability is obtained by $$P(i,j) \begin{cases} = 1, & \text{only when receiving beacon frame within } T(j) \\ = 1 - (B(j) \times D)/(C(j) \times T(j)), & \text{otherwise,} \end{cases}$$

where p(i,j) represents a stability of a link to node j from node i, T(j) represents an update period for node j in the neighbor node table, B(j) represents the number of beacon frames lost during T(j) with respect to node j, D represents a beacon frame transmission period, and C(j) represents the number of beacon frames received from node j during T(j).

4. The method as claimed in claim 3, wherein the neighbor node table comprises an Identifier (ID), an address, the number of beacon frames which have not been received within the update period, and a link stability, for each neighbor node.

5. A packet routing apparatus of a node in an ad-hoc network, the apparatus comprising:
a packet transmission/reception unit for transmitting/receiving a packet;
a memory unit for storing a neighbor node table and a threshold value; and
a routing controller for periodically calculating a link stability with respect to each neighbor node, the link stability based on a number of received beacon frames and a number of non-received beacon frames within an update period for each neighbor node, updating the calculated link stability in the neighbor node table, identifying a neighbor node which is closer to a destination node of a received packet than the node when the node does not correspond to the destination node, and transmitting the received packet to the identified neighbor node when a link stability of the identified neighbor node is greater than or equal to the threshold value.

6. The apparatus as claimed in claim 5, wherein the routing controller transmits the received packet to a random neighbor node among the neighbor nodes when the link stability of the identified neighbor node is less than the threshold value.

7. The apparatus as claimed in claim 6, wherein the link stability is obtained by $$P(i,j) \begin{cases} = 1, & \text{only when receiving beacon frame within } T(j) \\ = 1 - (B(j) \times D)/(C(j) \times T(j)), & \text{otherwise,} \end{cases}$$

where p(i,j) represents a stability of a link to node j from node i, T(j) represents an update period for node j in the neighbor node table, B(j) represents the number of beacon frames lost during T(j) with respect to node j, D represents a beacon frame transmission period, and C(j) represents the number of beacon frames received from node j during T(j).

8. The apparatus as claimed in claim 7, wherein the neighbor node table comprises an Identifier (ID), an address, the number of beacon frames which have not been received within the update period of the neighbor node table, and a link stability, for each neighbor node.

* * * * *